Aug. 27, 1929.            J. T. FRIEDLI                1,725,958
                    REGISTERING DECELEROMETER
                    Filed Feb. 24, 1926        2 Sheets-Sheet 1
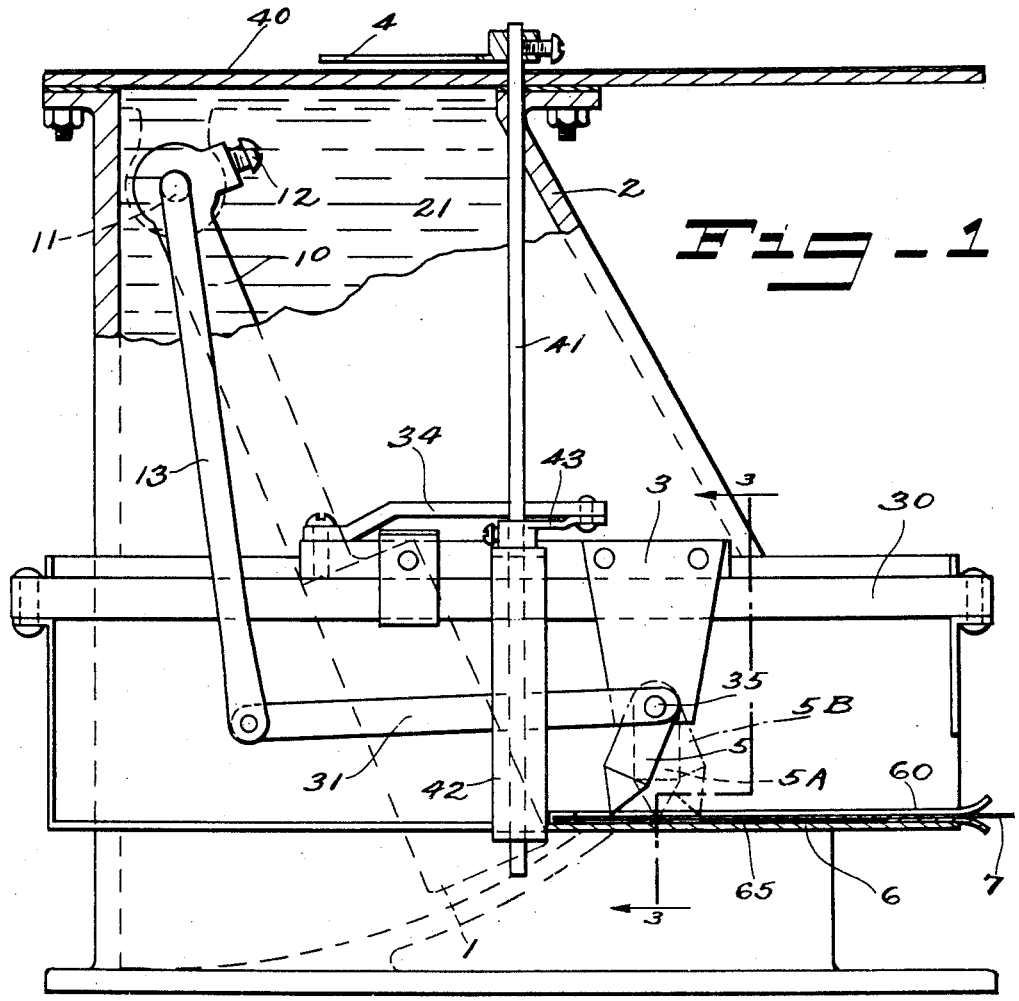
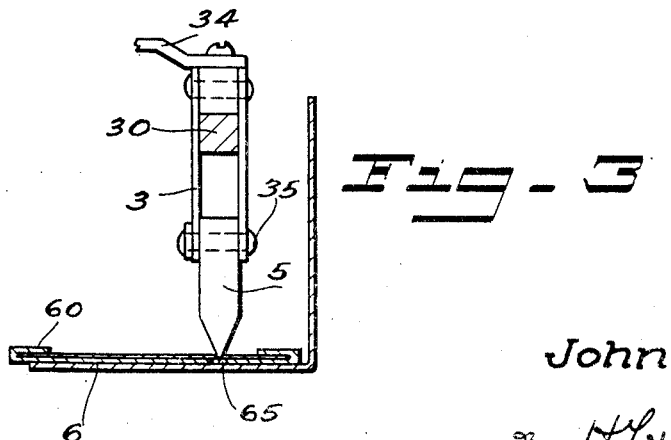
Inventor
John T. Friedli
By H.L. & S.L. Reynolds
Attorneys Patented Aug. 27, 1929.

1,725,958

UNITED STATES PATENT OFFICE.

JOHN T. FRIEDLI, OF SEATTLE, WASHINGTON.

REGISTERING DECELEROMETER.

Application filed February 24, 1926. Serial No. 90,283.

My invention is concerned with the provision of means whereby a record can be made of the rate of deceleration of vehicles, such as an automobile, with the particular object in view of ascertaining if the vehicle brakes are in proper working order.

Heretofore it has only been possible to indicate the condition of the brakes, either by actual measurement of the distance within which the vehicle can be stopped when going at various rates of speed, or by visual indications on a decelerometer carried by the vehicle, but so far as I am aware it has never been possible to provide a permanent record of the condition of the vehicle's brakes automatically registered and capable of being produced as evidence of their condition at the time of the test. By providing such a permanent record, automatically registered, it becomes possible for the first time to provide by legislation for tests and to prove by competent evidence whether or not the vehicle's brakes are in the condition required by law.

Associated with the objects indicated above, it is also an object to provide an indication visible to the testing officer and to the driver, in addition to the permanent record.

A further object is the simplification of decelerometers to the end that they may be more reliably and cheaply constructed.

A further object is the provision of a card whereon the result of a test can be permanently recorded, and whereon such results can be analyzed and interpreted and permanently identified with the car tested.

My invention comprises the novel decelerometer and the novel parts and combinations thereof, as shown in the accompanying drawings, described in the specification, and particularly defined by the claims terminating the same.

In the accompanying drawings I have shown my invention in a form which is now preferred by me.

Figure 1 is a side elevation, parts being broken away and the casing being removed, showing my invention in the act of recording and registering the rate of deceleration of a vehicle.

Figure 3 is a section on line 3—3 of Figure 1.

Figure 2:
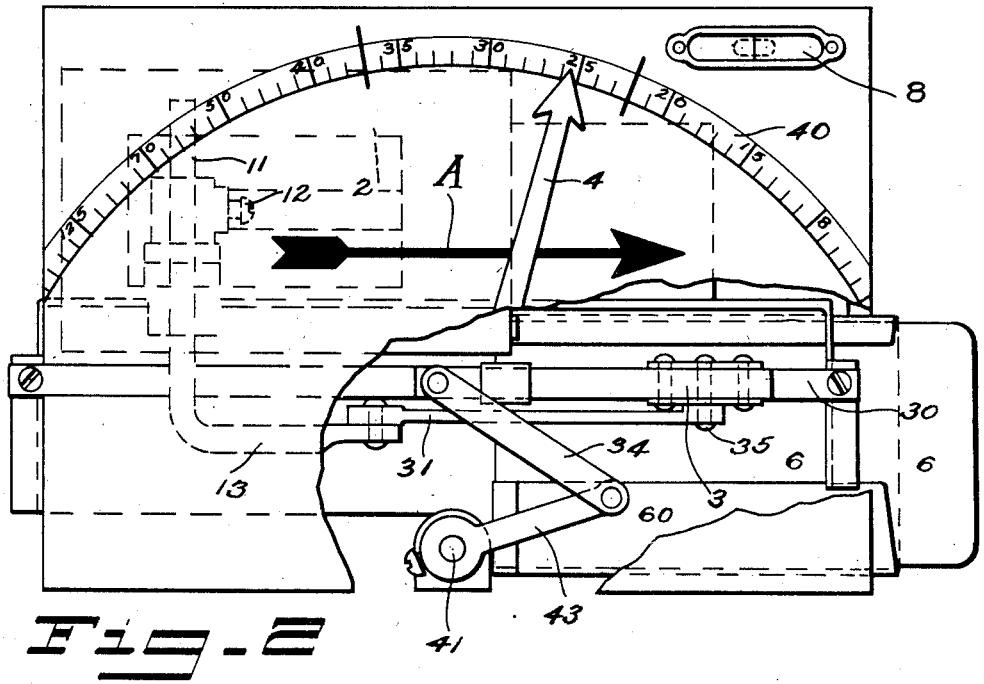
Figure 2 is a plan view of the device as illustrated in Figure 1.

In common with most decelerometers, I employ a weight 1 mounted to swing upon the end of an arm 10 and within a casing 2, forming an oil reservoir 21. Normally the weight 1 hangs vertically downward beneath its supporting shaft 11, but upon deceleration of a vehicle carrying the decelerometer, the weight 1 will swing forward. The oil is used to prevent movement of the weight under the influence of superficial jars and to retard its forward movement. The weight is shown as secured upon a transverse shaft 11, a set screw 12 permitting adjustment of the arm relative to the shaft, and the shaft being bent downward to form an arm 13 outside of the casing 2.

A dial 40 is supported above the casing 2, and a pointer 4 cooperates with the dial to indicate the distance, preferably expressed in feet, within which the vehicle can stop when the brakes are applied with the vehicle running at a selected speed, generally 20 miles an hour. It has been found that these readings are accurate when the vehicle is running only approximately at the indicated speed. The pointer 4 is, of course, under control of the weight 1 and the connection therebetween may be any found suitable, although preferably the connection which will be described hereafter is employed.

Alongside the casing 2 is supported a longitudinal guide 30 upon which a slide 3 is movable. The slide 3 is connected to the arm 13, as by a link 31, by means of which the slide is advanced in accordance with movements of the weight 1. The slide 3 may also be connected to operate the pointer 4, as by means of a link 34 connecting the slide 3 and an arm 43 secured upon a vertical shaft 41, supported in a fixed journal at 42, and carrying the pointer 4 upon its upper end.

A marker 5 is carried by the slide 3, or is otherwise connected to be advanced in accordance with movements of the weight 1. Preferably this marker depends from a pivotal connection at 35 upon the guide 3. It is movable with the guide 3 over a card-positioning means indicated as the table 6 and guide flanges 60 thereof. Normally, with no card in the card positioning means, the tip of the marker 5 hangs vertically downward and passes between the edges of a groove 65 formed in the table 6. Thus it does not engage any portion of the table 6 or other parts of the card-positioning means although it passes thereover. With a card 7 inserted from without an enclosing casing (not shown) and positioned by the flanges 60 upon the table 6, the tip of the marker 5 will engage the card as the marker is advanced, and preferably the marker is so arranged (as shown in full lines in Figure 1) that it will not be permitted to return by reason of its engagement of the card after it has been advanced by the swinging of the weight, to its maximum forward position. The card 7, however, can be withdrawn after the marker has been advanced, but the act of withdrawing the card causes the marker to swing past its vertical position 5$^A$ and to be deflected rearward to position 5$^B$, but in so doing the tip of the marker impresses a permanent record, as for example, a punch mark, in the card. When thus deflected into position 5$^B$, the marker will return to its original position, together with the weight 1. Instead of punching the card, the marker can be arranged to leave a mark thereon, or in some equivalent manner indicate the maximum forward position attained by it.

Figure 4:
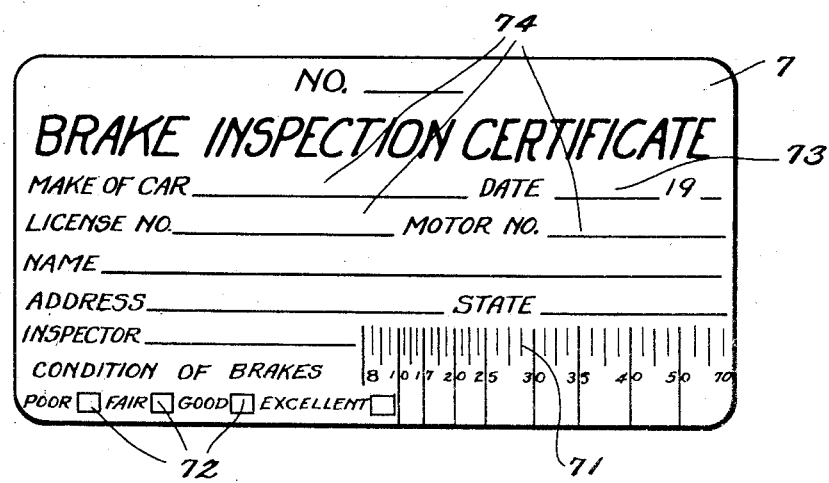
Figure 4 is an illustration of the report card or certificate.

The card, which is shown in Figure 4, may be provided with a series of graduations, indicated at 71, so positioned that the tip of the marker 5 will pass thereover when the card is properly inserted in position, and when the marker is swung by movement of the weight corresponding to a change in velocity of the vehicle. As shown in Figure 4, movement of the marker is from right to left as the car loses velocity. The result is that at the instant the car comes to rest, the weight 1 will have advanced to its farthest from normal position, and the marker 5 will have reached its utmost advanced position corresponding to the rate of deceleration. Return movement of the marker and the weight is prevented by engagement of the marker tip with the card 7. As the card is withdrawn, the marker still in engagement with it indents a punch mark opposite one of the graduations 71. Thus the law may require that a vehicle be able to stop within 37 feet when going at 20 miles an hour. If the record on the card shows that the vehicle cannot stop within 45 feet when going at this rate of speed, it indicates that the brakes are not in condition to comply with the law and the inspector can rate it as poor, spaces being provided for such rating at 72. The inspector can indicate the date of the test at 73 and can identify the car through numbers and the like as indicated at 74. Thus a permanent record is left of the condition of the car's brakes at a given time, and the driver can be required to correct any faulty brakes, or if he does not do so the permanent record can be produced to show that he was so required to do and he can be disciplined for failure to comply with the proper requirements. The driver cannot say that a mistake was made in the test, for the record is permanent and speaks for itself.

It is essential that the device be set into a vehicle placed on the floor with the weight 1 to the rear, and for that reason I provide an arrow A on the dial 40 to indicate the direction of movement of the car. It is preferable that the device be level or substantially so in order that when the weight 1 hangs down the pointer 4 and the marker 5 will be at zero indications. To enable this to be accomplished, I may provide a spirit level 8 placed in the dial 4.

What I claim as my invention is,

1. In combination with a member movable in accordance with change of velocity, card-positioning means, a card insertible therein and removable therefrom, a marker and operative connections between said marker and said first member, whereby said marker is advanced over the card in accordance with the first member's movement, and means permitting withdrawal of the card, thereby causing the impression of a permanent record by said marker upon the card.

2. In combination with a member movable in accordance with change of velocity, card-positioning means, a card insertible therein and removable therefrom, a marker and operative connections between said marker and said first member, whereby said marker is advanced over the card in accordance with the first member's movement, said card, card-positioning means, and marker being relatively disposed and arranged to prevent return movement of the marker except after it has been pressed through the card to leave a permanent record.

3. In combination with a member movable in accordance with change of velocity, card-positioning means, a card insertible therein and removable therefrom, a marker, operative connections between said marker and said first member including a pivotal support from which said marker depends, said marker being movable over the positioning means, and its tip being engageable with a card when held in said positioning means to be rearwardly deflected and held thereby against return movement, said card, upon its withdrawal, engaging the marker to deflect it forwardly, and thereby to impress the tip of the marker upon the card as the marker passes its depending position.

4. In a decelerometer, in combination, a card-positioning means having a groove in its under surface, a marker movable over said means and over a card held therein, the tip of said marker normally depending within said groove, but engaging a card held within said positioning means to be deflected rearwardly thereby, and to be held thereby against return movement, said marker being movable upon its pivot by withdrawal of the card to impress its tip upon the card, and means for advancing said marker in accordance with deceleration of a supporting vehicle.

5. In a decelerometer, in combination, a card positioning means, a marker movable over said means and engageable with a card held therein to leave a record thereon, the engagement of said marker with said card serving to prevent its return from its maximum forward position, a member movable in accordance with deceleration of a supporting vehicle, and operative connections between said member and the marker.

6. In combination with a member movable in accordance with change of velocity, means for positioning a card, a marker operatively positioned relative to said card, and means movable from said first member for advancing said marker over the card in accordance with the change of velocity, the members being disposed and arranged, relative to each other, so that the marker is maintained in its most advanced position by said card.

7. In combination with a member movable in accordance with change of velocity, means for positioning a card, a marker operatively connected to said member and movable over the card, said marker being maintained in its most advanced position by said card and means to cause said marker to impress upon said card at will the indication corresponding with such advanced position.

8. In a recording device, an element mounted to move in response to changes in speed and a card coacting therewith to affect the movement of the element and to be marked thereby.

9. In a recording device, an element mounted to move in response to changes in speed and a card coacting therewith to arrest the element in a certain position and to cause the element to mark the card when the latter is withdrawn, thus releasing the element.

10. In a recording device, an element mounted for reciprocating motion in response to changes in speed, and a card engageable therewith to hold the element in a position of furthest advance.

11. In a recording device, an element mounted for reciprocating motion in response to changes in speed, and a card engageable therewith to hold the element in a position of furthest advance, the card being arranged relative to the element so as to release the same and to receive an impression therefrom on the withdrawal of the card.

12. In a recording device, a pivotally suspended element, means for moving the pivot in response to changes in speed, and a card insertible under the element to cause the latter to drag thereover and to punch the card when the card is withdrawn.

13. A movable object, an element carried thereby and movable in response to changes in speed of the object, and means for arresting the element at its maximum advance cooperating with the element to release the same and to be marked thereby when the said means is withdrawn.

Signed at Seattle, Washington, this 17th day of February, 1926.

JOHN T. FRIEDLI.